United States Patent

Simon et al.

(10) Patent No.: US 8,210,290 B2
(45) Date of Patent: Jul. 3, 2012

(54) METHOD FOR CONTROLLING THE OPERATION OF A GENERATOR IN A VEHICLE POWER TRAIN, AND A VEHICLE POWER TRAIN

(75) Inventors: Emmanuel Simon, Herrlisheim (FR); Oswald Friedmann, Lichtenau (DE); Christian Lauinger, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 683 days.

(21) Appl. No.: 12/315,181

(22) Filed: Nov. 29, 2008

(65) Prior Publication Data

US 2009/0145679 A1   Jun. 11, 2009

Related U.S. Application Data

(60) Provisional application No. 61/004,898, filed on Nov. 30, 2007, provisional application No. 61/125,226, filed on Apr. 23, 2008.

(51) Int. Cl.
*B60K 6/44* (2007.10)
*B60K 6/445* (2007.10)
*B60W 10/00* (2006.01)
*B60W 20/00* (2006.01)

(52) U.S. Cl. ......... 180/65.225; 180/65.235; 180/65.285; 180/65.265; 180/65.275

(58) Field of Classification Search ............... 180/65.21, 180/65.22, 65.225, 65.235, 65.245, 65.25, 180/65.285, 65.265, 65.275
See application file for complete search history.

(56) References Cited

U.S. PATENT DOCUMENTS

| | | | |
|---|---|---|---|
| 5,495,912 A * | 3/1996 | Gray et al. ............... 180/165 |
| 6,359,404 B1 * | 3/2002 | Sugiyama et al. ......... 318/432 |
| 7,007,464 B1 * | 3/2006 | Asami et al. ............. 60/300 |
| 7,410,436 B2 * | 8/2008 | Van Druten et al. ........ 475/5 |
| 7,478,690 B2 * | 1/2009 | Kim ...................... 180/65.25 |
| 7,891,450 B2 * | 2/2011 | Soliman et al. ......... 180/65.265 |
| 2005/0039572 A1 | 2/2005 | Friedmann ............... 74/661 |
| 2006/0100057 A1 * | 5/2006 | Severinsky et al. ........ 477/4 |
| 2006/0180363 A1 * | 8/2006 | Uchisasai et al. ........ 180/65.2 |
| 2006/0225984 A1 * | 10/2006 | Tanishima et al. ........ 192/48.8 |
| 2006/0278448 A2 * | 12/2006 | Baginski et al. .......... 180/65.2 |
| 2007/0107957 A1 * | 5/2007 | Lehrer .................. 180/65.2 |
| 2007/0278022 A1 * | 12/2007 | Tanishima .............. 180/65.2 |
| 2008/0099260 A1 * | 5/2008 | Abe et al. .............. 180/65.4 |

FOREIGN PATENT DOCUMENTS

DE   198 50 811 A1   5/2000
DE   102 43 535 A1   4/2003

* cited by examiner

*Primary Examiner* — John R Olszewski
(74) *Attorney, Agent, or Firm* — Alfred J. Mangels

(57) ABSTRACT

A method for controlling the operation of a generator connected to an electrical energy storage unit in a vehicle power train. An engine is connected to a drive shaft of the vehicle through a transmission and with an interrupting device with which the transmission of torque from the engine to the drive shaft is interruptible. When the transmission of torque between the engine and the drive shaft is interrupted the generator is driven from the drive shaft.

12 Claims, 5 Drawing Sheets

METHOD FOR CONTROLLING THE OPERATION OF A GENERATOR IN A VEHICLE POWER TRAIN, AND A VEHICLE POWER TRAIN

BACKGROUND OF THE INVENTION

1. Field of the Invention

The present invention relates to a method for controlling the operation of a generator connected to an electrical energy storage unit in a vehicle power train. An engine is connected to a drive shaft of the vehicle through a transmission, and an interrupting device is provided with which the transmission of torque from the engine to the drive shaft is interruptible. The invention also relates to a vehicle power train including an engine that is connected to a drive shaft of the vehicle through a transmission, an interrupting device with which the transmission of torque from the engine to the drive shaft is interruptible, and a generator connected to an electrical energy storage unit.

2. Description of the Related Art

Vehicle power trains are known that contain a transmission between an engine, for example an internal combustion engine, and a drive shaft of the vehicle, in which the transmission does not enable any transmission of torque from the drive engine to the drive shaft when the vehicle is decelerating. Thus, in an operating state in which the vehicle is not being propelled by the engine but is traveling due to the kinetic energy stored in it, the vehicle cannot be braked with the aid of a drag torque of the engine. The same is true of vehicle power trains that contain an overrunning clutch or a clutch that is actuatable by a control unit and with which the transmission of torque from the engine to the vehicle can be interrupted when decelerating, so that the engine can be shut off in order to save fuel. Such vehicles must be braked exclusively by actuating the wheel brakes, which not only requires habituation, but also means additional brake wear with additional burdening of the environment.

An example of a transmission in which the transmission of torque is interrupted when decelerating is, for example, a continuously variable gear-neutral transmission, for example a crank CVT (a continuously variable transmission, one having a continuously variable transmission ratio), such as is known from published German patent application DE 102 43 535 A1, for example.

An object of the present invention is to provide a remedy for the above-mentioned problem.

SUMMARY OF THE INVENTION

Briefly stated, in accordance with one aspect of the present invention, a method is provided for controlling the operation of a generator connected to an electrical energy storage unit in a vehicle power train. An engine is connected to a drive shaft of the vehicle through a transmission, and an interrupting device is provided with which the transmission of torque from the engine to the drive shaft is interruptible. When the transmission of torque between the engine and the drive shaft is interrupted the generator is driven from the drive shaft.

Advantageously, electrical energy produced by the generator when the energy storage unit is full is fed to an electrical energy-consuming component.

Another solution to the problem of the invention is achieved with a vehicle power train that contains an engine that is connected to a drive shaft of the vehicle through a transmission, an interrupting device with which the transmission of torque from the engine to the drive shaft is interruptible, and a generator connected to an electrical energy storage unit. The power train also contains a drive device that drivingly connects the drive shaft to the generator when the transmission of torque between the engine and the drive shaft is interrupted.

The interrupting device can be an overrunning clutch that interrupts the transmission of torque when the vehicle is in the deceleration mode.

The drive device contains a clutch controllable by a control unit, for example, which control unit engages the clutch when the transmission of torque is interrupted.

The drive device can also include an additional transmission having a changeable transmission ratio. Advantageously, the transmission ratio of the additional transmission is changeable as a function of at least one operating parameter of the power train.

The generator can optionally be drivable by the engine or by the drive shaft.

In one embodiment of the vehicle power train in accordance with the present invention, the transmission has an input shaft that is non-rotatably connected with the engine and an output shaft that is non-rotatably connected with the drive shaft. Between the input shaft and the output shaft of the transmission a free-wheel device is arranged that disengages when the vehicle is in the deceleration mode. The input shaft and the output shaft are each connected with the generator through an overrunning clutch in such a way that the generator is driven by the output shaft, which is rotating at a higher speed.

The generator can be a component of a starter/generator.

The electrical power produced by the generator is advantageously controllable as a function of at least one operating parameter of the power train.

The generator can be connected through a switching device to the electrical storage element and/or to an electrical energy-consuming component.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
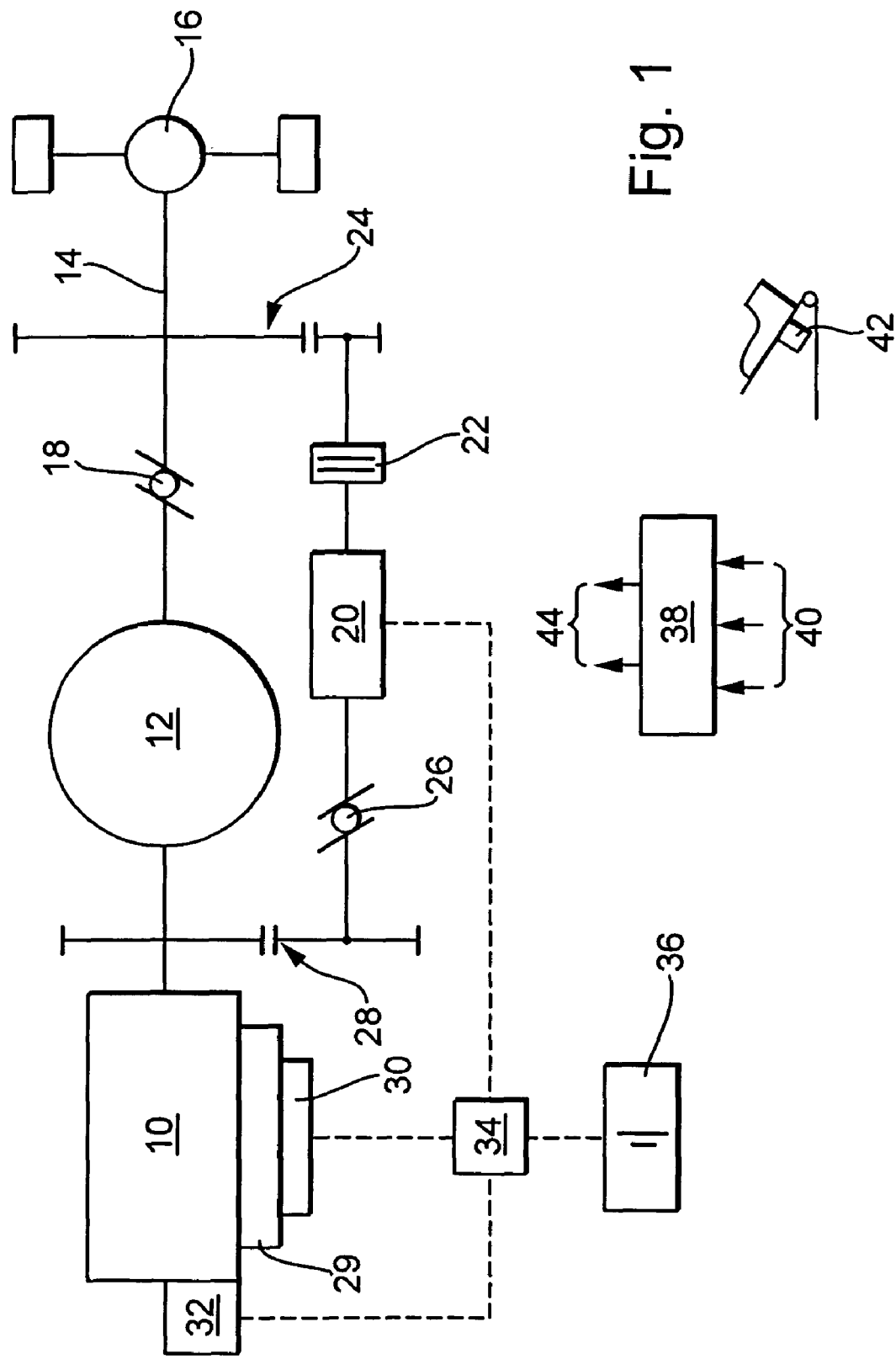
FIG. 1 is a schematic diagram of a first embodiment of a power train in accordance with the present invention.

As shown in FIG. 1, an engine 10 is connected through a transmission 12 to a drive shaft 14 of a vehicle, which drives vehicle wheels through a differential 16.

Engine 10 is preferably an internal combustion engine. Transmission 12 can be of any type of construction, for example a manual shift transmission, an automated shift transmission, an automatic transmission, etc., and is distinguished by the fact that it is connected to the drive shaft 14 through an overrunning clutch 18. The overrunning clutch 18 is such that the torque can be transmitted from the engine 10 to the drive shaft 14, but no torque is transmitted from the drive shaft 14 to the transmission 12 or to the engine 10. Thus, overrunning clutch 18 disengages when the vehicle is in the deceleration mode. Overrunning clutch 18 can be an integral component of transmission 12, as is the case for example in a crank CVT such as that described in published German patent application DE 102 43 535 A1. A startup component (not shown) can be positioned between engine 10 and transmission 12 and can be a torque converter or a startup clutch, for example.

A generator 20 for producing electrical energy is connected to drive shaft 14 through a clutch 22 that is operable by an actuator and through a gear stage 24, and is connected to a drive shaft of engine 10 through an overrunning clutch 26 and another gear stage 28.

A cooling system for engine 10 is identified by 29. An electrical resistor 30 is situated in cooling system 29. And a starter for engine 10 is identified by 32.

The electrical energy produced by generator 20 can be fed via a controllable DC/AC converter 34 optionally to an electrical energy storage unit 36, for example a battery, or to electrical resistor 30. Starter 32 can be supplied with current from electrical energy storage unit 36 through converter 34, which is designed in a known manner as a semiconductor circuit.

The described system is controlled by an electronic control unit 38, whose inputs 40 are connected to sensors, for example an accelerator pedal position sensor 42, a brake pedal position sensor (not shown), and possibly additional sensors for detecting operationally relevant values. Outputs 44 of control unit 38 are connected to converter 34, to clutch 22, and possibly to additional actuators of the power train. The construction and function of the individual sub-components are known and therefore will not be explained in detail. The operation of the power train as a whole will be explained below:

When the vehicle is being propelled by engine 10, overrunning clutch 18 is engaged. Clutch 22 is disengaged and generator 20 is driven by internal combustion engine 10 through gear stage 28 and engaged overrunning clutch 26, and it charges battery 36 in the usual manner or it produces electrical energy to supply the various electrical energy consuming components of the vehicle.

When the operator's foot is withdrawn from the accelerator pedal, the vehicle goes into the deceleration mode. In that mode the speed of engine 10 drops and overrunning clutch 18 disengages. Clutch 22 is then engaged by control unit 38, so that generator 20 is driven from drive shaft 14 through gear stage 24. As soon as the speed of drive shaft 14 is greater than the speed from the output of gear stage 28, overrunning clutch 26 disengages automatically.

The power produced by generator 20 is controlled by control unit 38 as a function of the operation of the accelerator pedal, so that almost no braking effect comes from generator 20 when the operation of the accelerator pedal is reduced so far that the vehicle requires no drive torque. If the actuation of the accelerator pedal is reduced further, i.e., if braking of the vehicle is desired, the power produced by generator 20 is increased by control unit 38 by actuating DC/AC converter 34, so that the braking effect of generator 20 increases until it reaches a maximum when the accelerator pedal is not actuated. If strong braking is desired, an operator actuates the brake pedal, whereupon the vehicle is braked in the usual manner with its wheel brakes. At the same time, generator 20 advantageously remains at its setting for maximum power, so that it supports the wheel brakes in providing the braking effort.

If battery 36 is fully charged (the charge state of the battery is detected by control unit 38), the power produced by generator 20 is fed to electrical resistor 30, so that it is converted into heat that is fed into cooling system 29 and is discharged to the environment. Alternatively, or in addition, excess energy that is not storable in battery 36 is fed to starter 32, which supports the rotation of the idling internal combustion engine, or begins to rotate internal combustion engine 10 without the latter being supplied with fuel or ignited. Alternatively, excess electrical energy can also be stored in a special additional electrical energy storage unit, so that it is subsequently available for the vehicle or can be fed to electrical energy consuming components that can receive it.

As soon as the accelerator pedal is actuated again and the vehicle is again being driven by engine 10, generator 20 is again driven directly by internal combustion engine 10 through gear stage 28 as soon as the corresponding drive speed from the output of gear stage 28 is greater than the speed of drive shaft 14. Those rotational speeds are advantageously detected by speed sensors, so that control unit 38, disengages clutch 22 as soon as generator 20 is appropriately being driven directly from internal combustion engine 10.

Figure 2:
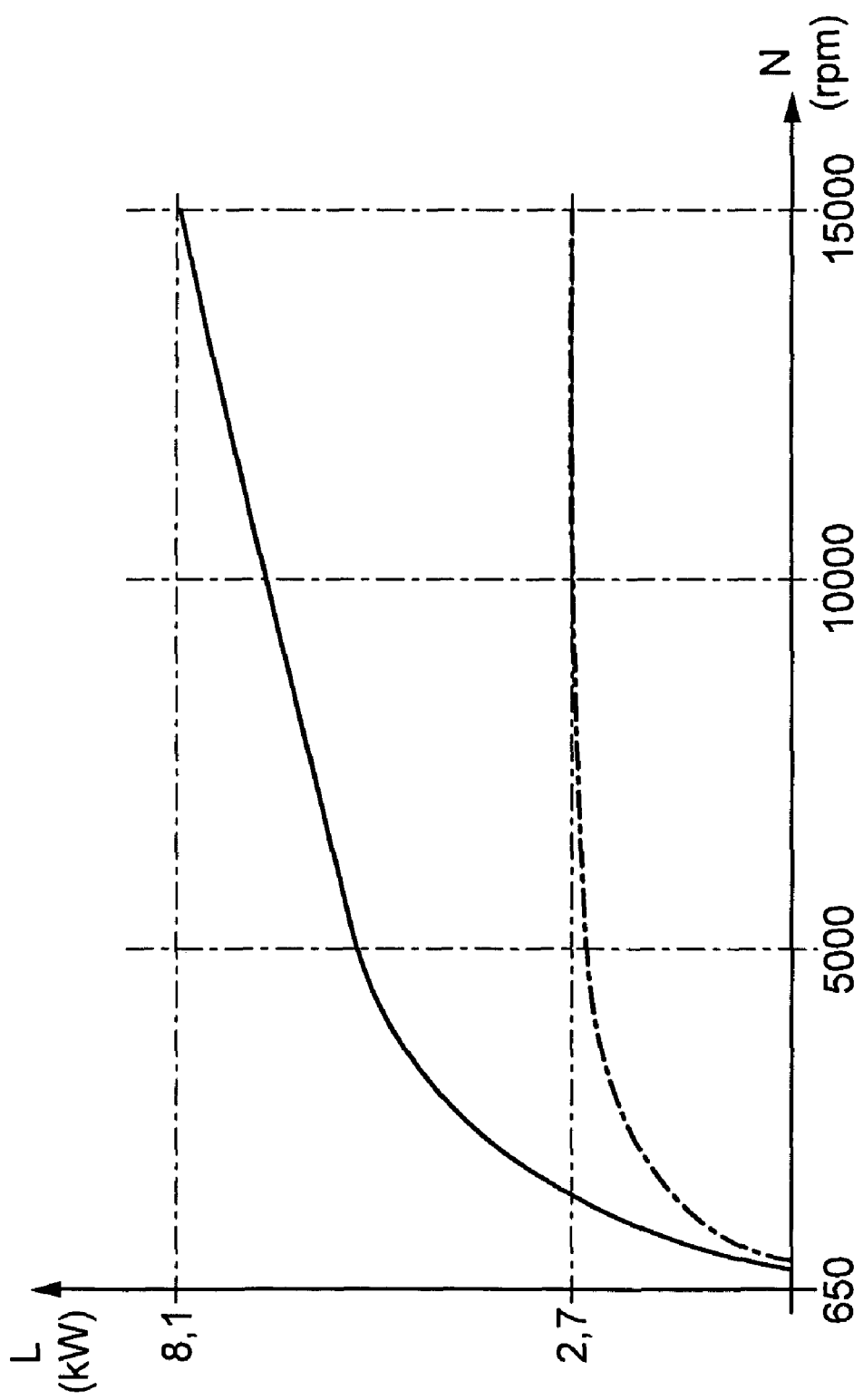
FIG. 2 is a graph showing characteristic curves to explain the operation of a generator.

FIG. 2 shows characteristic curves of a normal high-capacity vehicle generator. The abscissa represents the speed N of the generator in revolutions per minute, and the ordinate represents the power L in kilowatts. The solid curve shows the mechanical power consumption of the generator, i.e., the mechanical power that is needed to drive the generator so that the electrical power that is represented by the dashed curve can be produced. In the illustrated example, the maximum electric power of the generator is about 2.7 KW, which corresponds to approximately 190 A at a voltage of 14 V. That necessitates a mechanical power input of fully 8 kW. That value corresponds to the braking torque of a normal internal combustion engine having a displacement of 2 liters and at a speed of 2000 rpm.

Despite the interruption of torque transmission between the internal combustion engine 10 and the drive shaft 14 when in the deceleration mode, it is possible with the system shown in FIG. 1 to achieve a driving performance of the vehicle with which an operator is accustomed who expects engine braking of the vehicle when actuation of the accelerator pedal is withdrawn.

The system in accordance with FIG. 1 can be modified in several ways. For example, transmission 12 can be a conventional manual shift or automatic transmission. Overrunning clutch 18 can be a clutch operable by means of an actuator that is actuated by control unit 38 when an interruption of torque transmission is not wanted while in the deceleration mode, for example during a long descent. Internal combustion engine 10 can idle when in the deceleration mode, or it can be shut off completely, as is customary with modern stop-start systems. Overrunning clutch 26 can also be a clutch actuatable by control unit 38. Gear stages 24 and 28 are chosen so that the best possible overall charging efficiency of generator 20 is achieved in normal operating cycles. Gear stage 24 can be executed to have a variable transmission ratio, which is controlled from control unit 38. Generator 20 can be present in addition to a normal generator provided on internal combustion engine 10, and gear stage 28 and overrunning clutch 26 can then be eliminated entirely.

Figure 3:
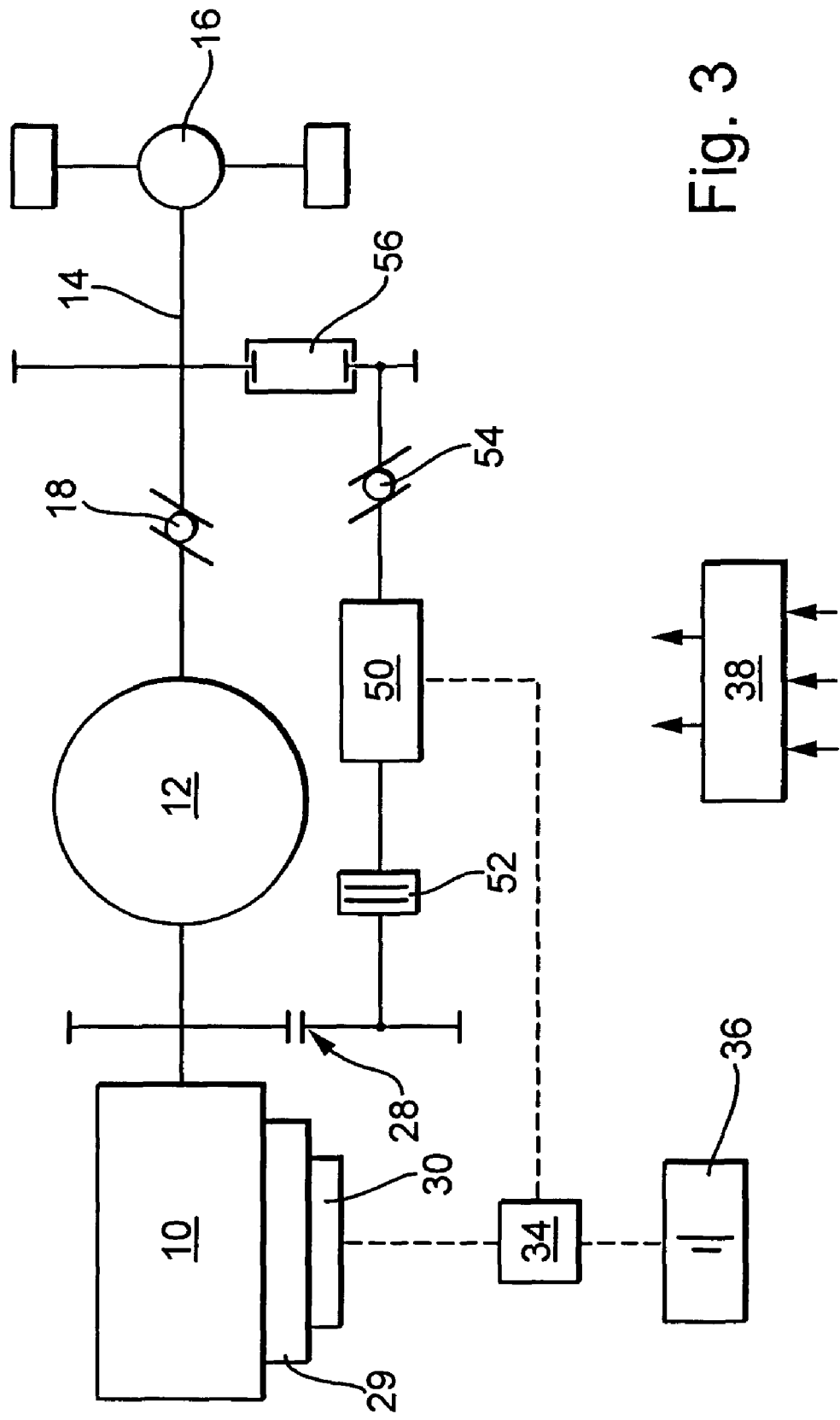
FIG. 3 is a schematic diagram of a second embodiment of a power train in accordance with the invention, modified relative to FIG. 1.

FIG. 3 shows an embodiment of the invention that is modified from that shown in FIG. 1, and the same reference numerals are used for corresponding components. In contrast to the FIG. 1 embodiment, the generating function of generator 20 of the FIG. 3 embodiment is provided in the FIG. 3 embodiment as a component of an electrical machine 50 that functions as a starter/generator. Internal combustion engine 10 can be started by means of starter/generator 50 through clutch 52, controlled by control unit 38, and through gear stage 28. Clutch 22 of the FIG. 1 embodiment is replaced by an overrunning clutch 54, which is connected to the drive shaft 14 through a transmission 56 having a variable transmission ratio. The transmission ratio of transmission 56 is controllable by control unit 38. The speed of the electrical machine 50 can be increased by means of the transmission 56 if a high braking torque is necessary when the drive shaft is rotating slowly. Overrunning clutch 54 disengages as soon as starter/generator 50 is driven at a higher speed from clutch 52 than from transmission 56.

Figure 4:
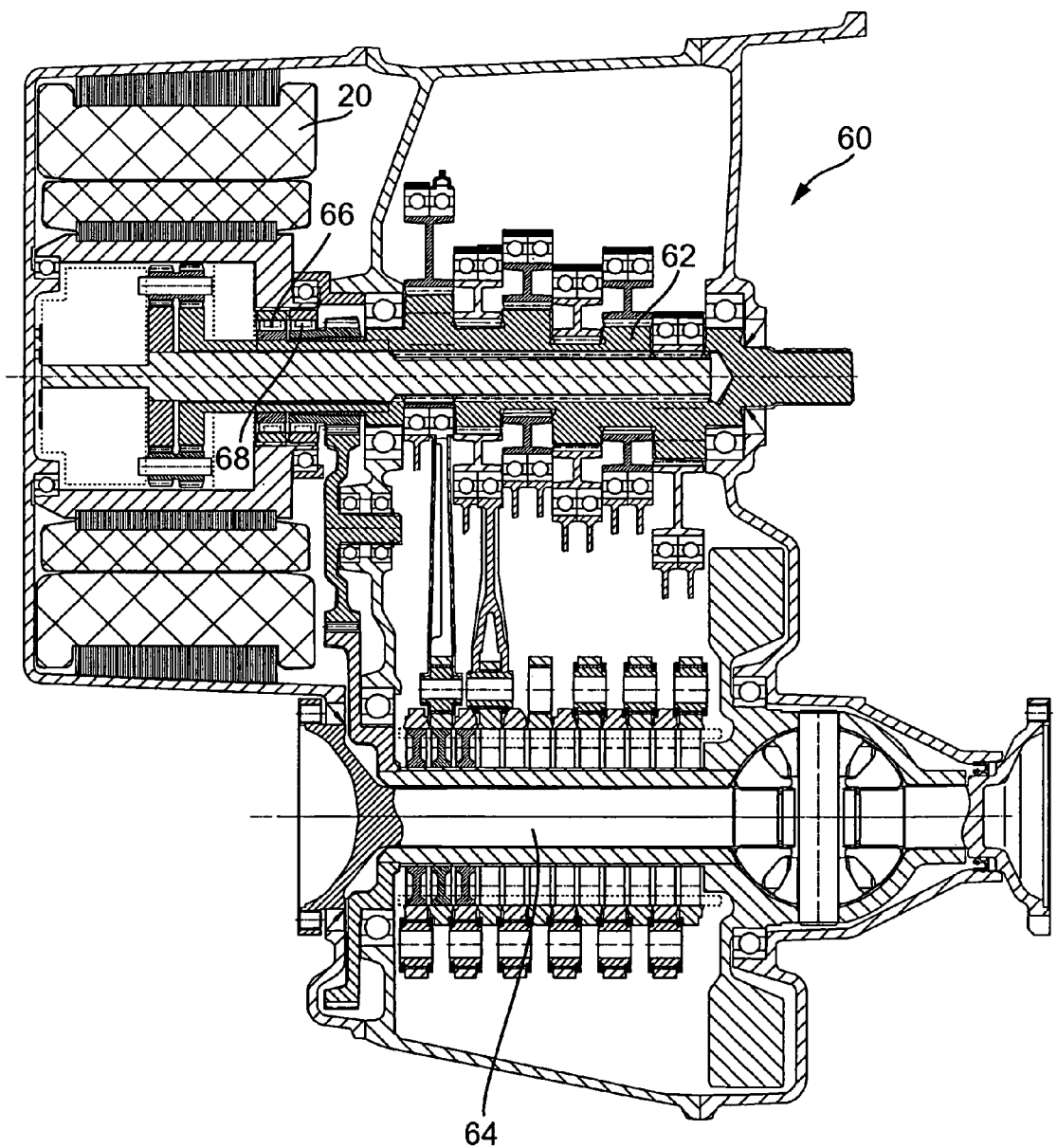
FIG. 4 is a cross-sectional view of a known crank CVT and including a generator and overrunning clutches in accordance with an embodiment of the present invention.

FIG. 4 shows a cross-sectional view of a crank CVT, such as is described in published German patent application DE 102 43 535 A1. That transmission, identified in the aggregate as 60, includes an input shaft 62 that is drivable by engine 10 of FIG. 1, and has an output shaft 64 that can be connected to the differential of the driven axle of the vehicle, for example, or, in the case of an all-wheel drive system, to the differentials of the other axles. The transmission transmits torque only from input shaft 62 to output shaft 64, and not in the opposite direction. With a transmission of that design, a generator 20 can be situated in a simple manner, by connecting it to input shaft 62 through a first overrunning clutch 66 and to output shaft 64 through a second overrunning clutch 68, wherein the two overrunning clutches only transmit torque from the respective shaft to the rotor of the generator. In that way, generator 20 is driven by input shaft 62 when the internal combustion engine is running, and is driven by output shaft 64 when the vehicle is in the deceleration mode.

Figure 5:
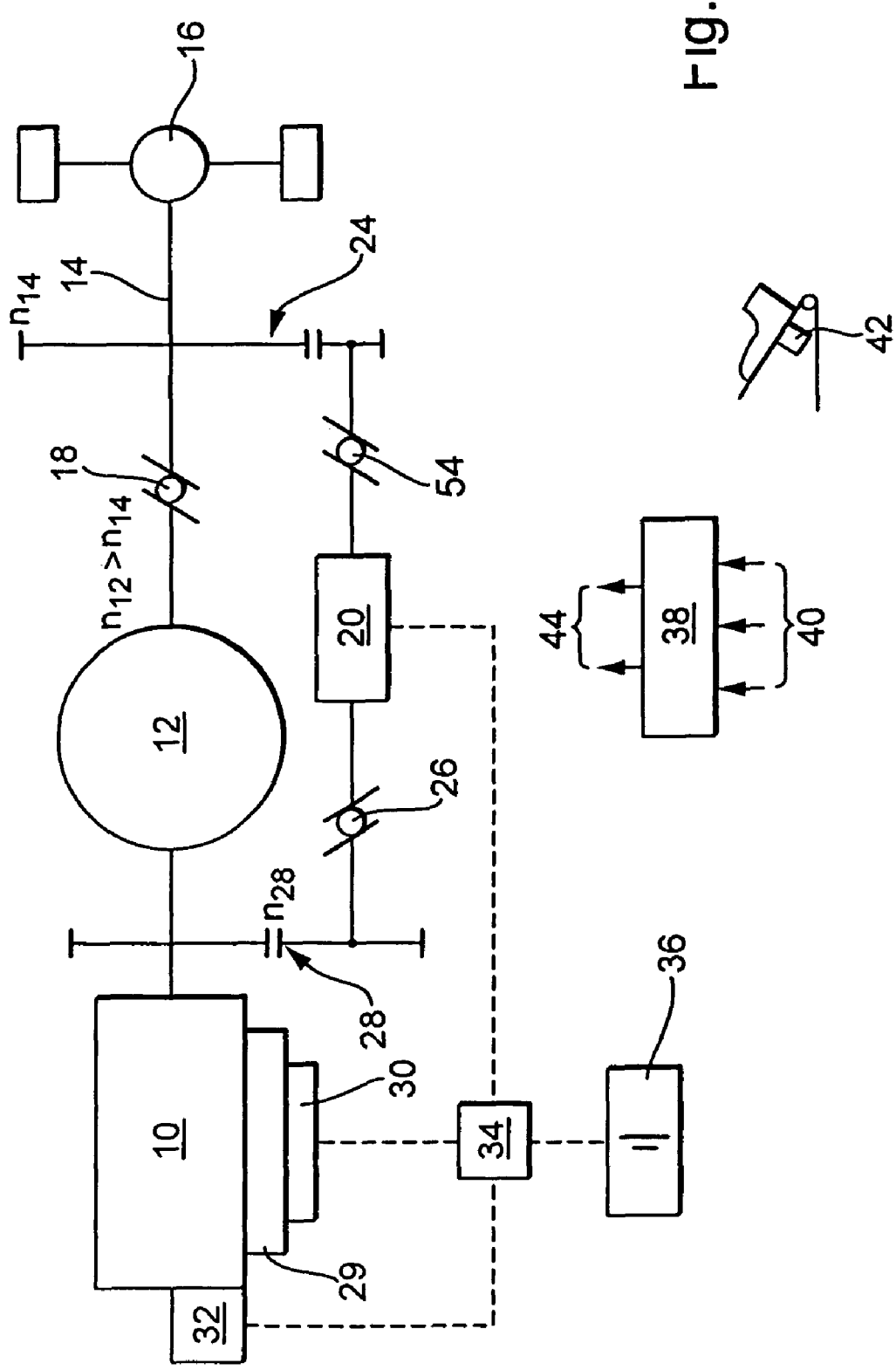
FIG. 5 is a schematic diagram of a third embodiment of a power train in accordance with the present invention, modified relative to FIG. 1.

FIG. 5 shows an embodiment of the present invention that is modified from the embodiment shown in FIG. 1, and showing schematically the system including a crank CVT of the type shown in FIG. 4. The same reference numerals are used to identify corresponding components. Generator 20 is connected to internal combustion engine 10 through a first overrunning clutch 26 and a gear stage 28, and to drive shaft 14 through a second overrunning clutch 54 and a gear stage 24. The two overrunning clutches only transmit torque from the respective shafts to the rotor of the generator. In that way, generator 20 is driven by the internal combustion engine when internal combustion engine 10 is running and the vehicle is traveling at less than 30 km/h. At vehicle speeds greater than 30 km/h generator 20 is driven by the vehicle itself.

The invention can be used in any power train in which in operating phases the transmission of torque between an engine and the driven wheels of the vehicle is interruptible in the deceleration mode.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for controlling the operation of a generator connected to an electrical energy storage unit in a motor vehicle power train, said method comprising the steps of:
    connecting an engine with a drive shaft of the vehicle through a transmission, wherein the transmission is operatively connected with a differential that transmits power to a drive wheel of the vehicle;
    connecting a first torque interrupting device between an output shaft of the transmission and the drive shaft for interrupting the transmission of torque from the engine to the differential;
    providing between the first torque interruption device and the differential a generator input torque connection;
    connecting a second torque interrupting device between the drive shaft and the generator input torque connection;
    connecting a generator output torque connection between the engine and the transmission through a third torque interrupting device; and
    driving the generator from the drive shaft when the transmission of torque between the engine and the drive shaft is interrupted.

2. A method in accordance with claim 1, including the step of feeding to an electrical energy-consuming component of the vehicle electrical energy produced by the generator when an energy storage unit of the vehicle is full.

3. A motor vehicle power train comprising:
    an engine that is operatively connected to a drive shaft of the vehicle through a first transmission, wherein the first transmission is operatively connected with a differential that transmits power to a drive wheel of the vehicle;
    a first torque interrupting device positioned between an output shaft of the first transmission and the drive shaft and with which transmission of torque from the engine to the differential is interruptible;
    a generator operatively connected to an electrical energy storage unit of the vehicle, the generator having a generator input torque connection between the first torque interruption device and the differential and having a generator output torque connection positioned between the engine and the first transmission
    a second torque interrupting device between the generator input torque connection and the drive shaft for selectively connecting the drive shaft to the generator when transmission of torque between the engine and the drive shaft is interrupted; and
    a third torque interrupting device connected between the generator output torque connection and the generator.

4. A motor vehicle power train in accordance with claim 3, wherein the first torque interrupting device is an overrunning clutch that interrupts the transmission of torque between the engine and the drive shaft when the vehicle is in a deceleration mode.

5. A motor vehicle power train in accordance with claim 3, wherein the second torque interrupting device includes a clutch controlled by a control unit, wherein the control unit engages the clutch when the transmission of torque between the engine and the drive shaft is interrupted.

6. A motor vehicle power train in accordance with claim 3, including a second transmission positioned between the drive shaft and the second torque interrupting device.

7. A motor vehicle power train in accordance with claim 6, wherein the transmission ratio of the second transmission is changeable as a function of at least one operating parameter of the power train.

8. A motor vehicle power train in accordance with claim 3, wherein the generator is selectively drivable by at least one of the engine and the drive shaft.

9. A motor vehicle power train in accordance with claim 3, wherein the first transmission has an input shaft that is non-rotatably connected with the engine and has an output shaft that is connected with the drive shaft; wherein the first torque interrupting device is a free-wheel device that disengages to prevent torque transfer from the differential to the engine when the vehicle is in deceleration mode, and wherein the first transmission input shaft and the first transmission output shaft are each connected with the generator through a respective overrunning clutch so that the generator is driven by the shaft of the first transmission that is rotating at a higher speed.

10. A motor vehicle power train in accordance with claim 3, including an electrical energy-consuming component of the vehicle, wherein the electrical energy consuming component is a component of a starter/generator.

11. A motor vehicle power train in accordance with claim 3, wherein electric power output produced by the generator is controlled as a function of at least one operating parameter of the power train.

12. A motor vehicle power train in accordance with claim 3, wherein the generator is connected to one of an electrical energy storage unit and an electrical energy consuming component of the vehicle through a switching device.

* * * * *